United States Patent [19]

Ives et al.

[11] Patent Number: 5,079,942
[45] Date of Patent: Jan. 14, 1992

[54] METHOD AND APPARATUS FOR CALIBRATING ROLLING MILL ON-LINE LOAD MEASURING EQUIPMENT

[75] Inventors: Kenneth D. Ives, Center Township, Porter County; David A. Hodges, Portage, both of Ind.

[73] Assignee: Westinghouse Electric Corp., Pittsburgh, Pa.

[21] Appl. No.: 565,000

[22] Filed: Aug. 8, 1990

Related U.S. Application Data

[62] Division of Ser. No. 343,763, Apr. 26, 1989, Pat. No. 4,974,442.

[51] Int. Cl.$^5$ .............................................. G01L 25/00
[52] U.S. Cl. ..................................................... 73/1 B
[58] Field of Search ................ 73/1 B, 862.55, 826.54

[56] References Cited

U.S. PATENT DOCUMENTS

| | | | |
|---|---|---|---|
| 3,918,302 | 11/1975 | Skelton et al. | 73/862.55 |
| 3,995,471 | 12/1976 | Konomi et al. | 73/1 R |
| 4,131,004 | 12/1978 | Eibe | 72/35 |
| 4,186,579 | 2/1980 | Eibe | 72/35 |
| 4,901,585 | 2/1990 | Shepard et al. | 73/862.55 |
| 4,993,270 | 2/1991 | Petit et al. | 73/862.55 |

FOREIGN PATENT DOCUMENTS 2611542 9/1988 France.

*Primary Examiner*—Tom Noland
*Attorney, Agent, or Firm*—G. H. Telfer

[57] ABSTRACT

In place calibration of the permanent on-line force measurement system of a rolling mill is performed by replacing the working rolls with dedicated calibration rolls, which can be scrap working rolls. Discontinuities formed in the cylindrical surfaces of dedicated calibration rolls, such as flat surfaces or preferrably flat bottomed longitudinal grooves, are engaged by interface members which also engage confronting flat surfaces or grooves in calibration load cells inserted between the dedicated calibration rolls. The interface members, which are made of a softer material than both the calibration rolls and the load cells, cold flows to evenly distribute the load and eliminate the need for precision machining of the interfaces. The dedicated calibration rolls can also be fixed, such as by welding, to dedicated calibration roll chocks which mount the calibration rolls in the mill housing to further prevent roll rotation and ejection of the calibration load cells. In some instances, when the braking effect of the deenergized work roll drive motor is sufficient, calibration can be performed using the normal working rolls with the aluminum interfaces with the calibration load cells having concave grooves which receive the working rolls.

19 Claims, 4 Drawing Sheets ured means, which engage the confronting grooves. The means preventing rotation of the rolls can alternatively, or in addition, include means which secure the dedicated calibration rolls to the dedicated calibration chocks. In the preferred embodiment, this securing means takes the form of an annular plate welded to both the dedicated calibration roll and the dedicated calibration chock. Rotation of the rolls can also be restrained, both for the dedicated rolls and the normal working rolls, by the drag of the deenergized working roll drive motor.

METHOD AND APPARATUS FOR CALIBRATING ROLLING MILL ON-LINE LOAD MEASURING EQUIPMENT

This is a division of application Ser. No. 07/343,763, filed Apr. 26, 1989, and now U.S. Pat. No. 4,974,442.

BACKGROUND OF THE INVENTION

1. Field of the Invention

This invention is directed to a method and apparatus for calibrating on-line load measuring equipment in rolling mills, such as hot and cold reduction mills and temper mills.

2. Background Information

Rolling mills are commonly provided with integral force measuring equipment for use in controlling the product produced by the mill. There is presently no commercially available means to calibrate a high capacity rolling mill force monitoring system. The system is calibrated in the factory before installation, but not as a system in service. However, many of the load cell configurations used in such systems can deteriorate under the non-uniformly applied multi-million pound loading to which they are exposed. The uneven loading results from many factors such as uneven thickness and/or temperature across the product fed into the mill. It is desirable to be able to calibrate the on-line force monitoring system in place, however, load cells cannot just be placed between the rolls because the uneven loading either causes the rolls to turn ejecting the load cells, or crushes the load cells at one corner or edge.

There remains a need therefore for a satisfactory method and apparatus for calibrating on-line rolling mill force measuring systems in place.

There is also a need for such an apparatus which can perform an in place calibration economically, accurately, and in a minimum amount of time.

It would be desirable to be able to perform such an in place calibration using scrap components.

SUMMARY OF THE INVENTION

These needs and desires, and others, are satisfied by the invention which comprises calibration force measuring means mounted between the working rolls of a rolling mill by interface members which are softer than both the rolls and the calibration force measuring means and means preventing rotation of the rolls so that the calibration force measuring means are not ejected when high calibrating loads are applied to the rolls. By making the interface member of softer material than both the rolls and the calibration force measuring means, the interface members cold flow to form interfaces which more evenly distribute the load applied to the calibration force measuring means without the need for precision machining.

In the preferred form of the invention, the working rolls are replaced by dedicated calibration rolls which may be scrap working rolls with their own dedicated chocks. The means preventing rotation of the rolls may be a discontinuity in the cylindrical surface of the dedicated calibration rolls, such as a flat surface, but preferably a longitudinal, ideally flat bottomed, groove. Corresponding longitudinal, preferably flat bottomed grooves are also formed in the confronting surfaces of the calibration load measuring means with the interface members comprising locking bars, preferably of softer material than both the dedicated roll and the calibration load The invention embraces both the method and apparatus for calibrating the permanent on-line load measuring system in a rolling mill. The invention makes possible such a calibration, which heretofore could not otherwise be performed, and does so in a manner which takes little time even where dedicated rolls replace the normal working rolls.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
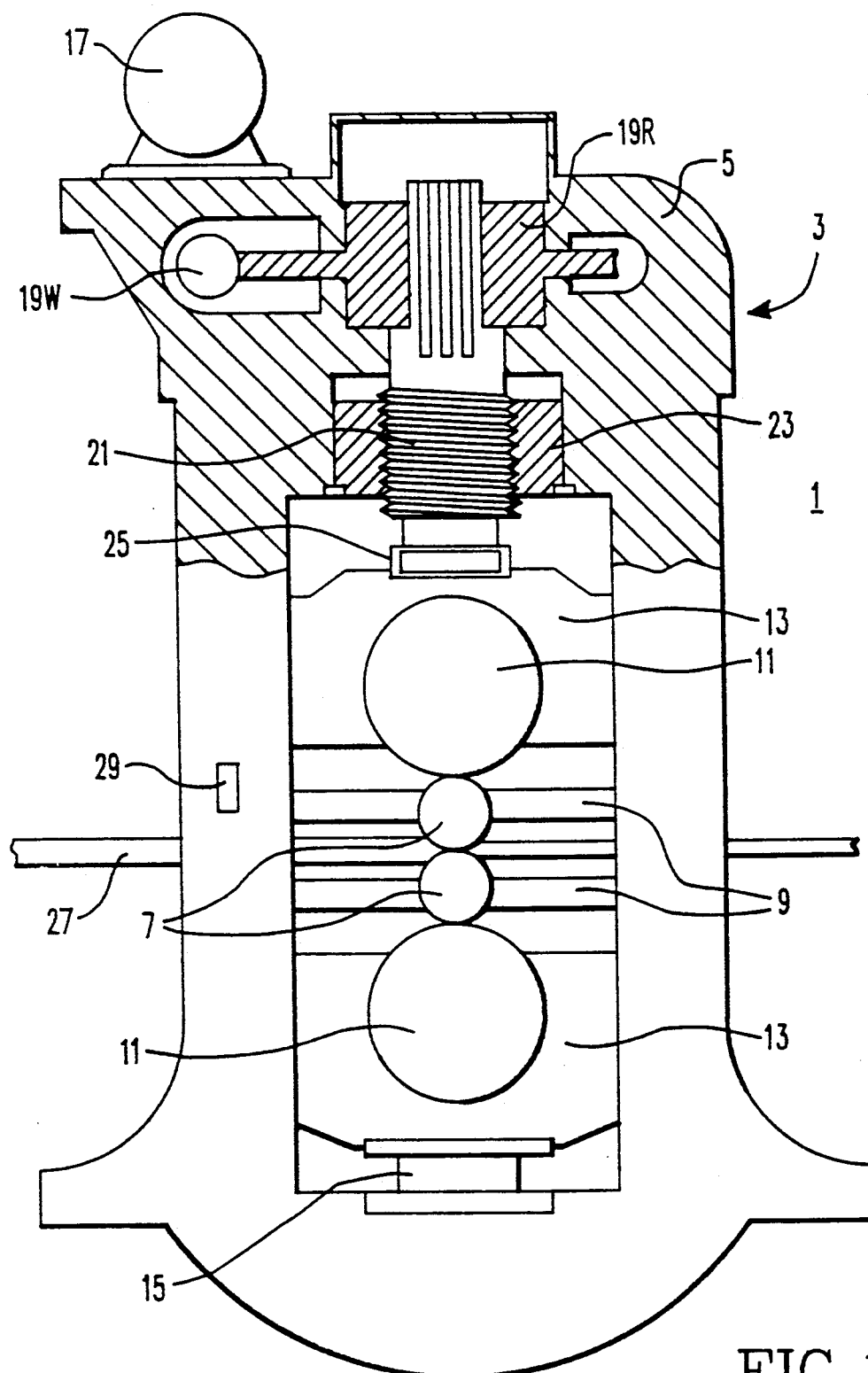
FIG. 1 is a side elevation view with some parts in section illustrating a prior art rolling mill to which the invention may be applied.

Referring to FIG. 1, a rolling mill 1 to which the present invention may be applied, comprises one or more mill stands 3 each of which includes a mill housing 5 having spaced sections extending vertically at each side of the mill stand. A pair of working rolls 7 are journaled at each end in working roll chocks 9 which are mounted in the spaced sections of the housing 5. A pair of back up rolls 11 are journaled in backup roll chocks 13 mounted in the mill housing 5 above and below the working rolls. The lower backup roll chocks 13 rest on sleds 15 which are also used to maneuver the rolls and their chocks during insertion and removal from the mill housing 5.

A drive motor 17 mounted on the top of the mill housing 54 drives a worm hear 19W engaged by a rim gear 19R which turns a screw 21 threaded through screw block 23 to apply a working force through chocks 13 and 9 to the backup rolls 11 and working rolls 7 respectively. Load cells 25 between the screws 21 and backup roll chocks 13 provide a permanent on-line system for measurement of the working force generated by the mill stand.

In operation, the product 27 such as a sheet of steel is fed from left to right in FIG. 1 through the work rolls 7. The exemplary mill, which is a reduction mill, thins the product. This requires very high working forces which in some instances reach several thousand metric tons. As is well known in the art, the backup rolls 11 bearing against the work rolls 7 resist the tendency of the work rolls to bend under these very high forces generated in the mill stand. Strain gauges 29 which measure elongation of the mill housing also provide an indication of the load applied to the product 27. The measurements generated in the load cells 25 on each side of the mill and in the strain gauges 29 are used by the mill operator along with other measurements to control the rolling process.

At the present time, there are no means available for calibrating the load cells 25 in place within the rolling mill. The load cells are calibrated in the factory but not once they are placed in service. As mentioned above, the load cells 25 can be damaged and provide inaccurate readings as a result of uneven loading. The present invention provides a means and apparatus for in place calibration of the permanent on-line working force measuring load cells and of the strain gauges 29.

Figure 2:
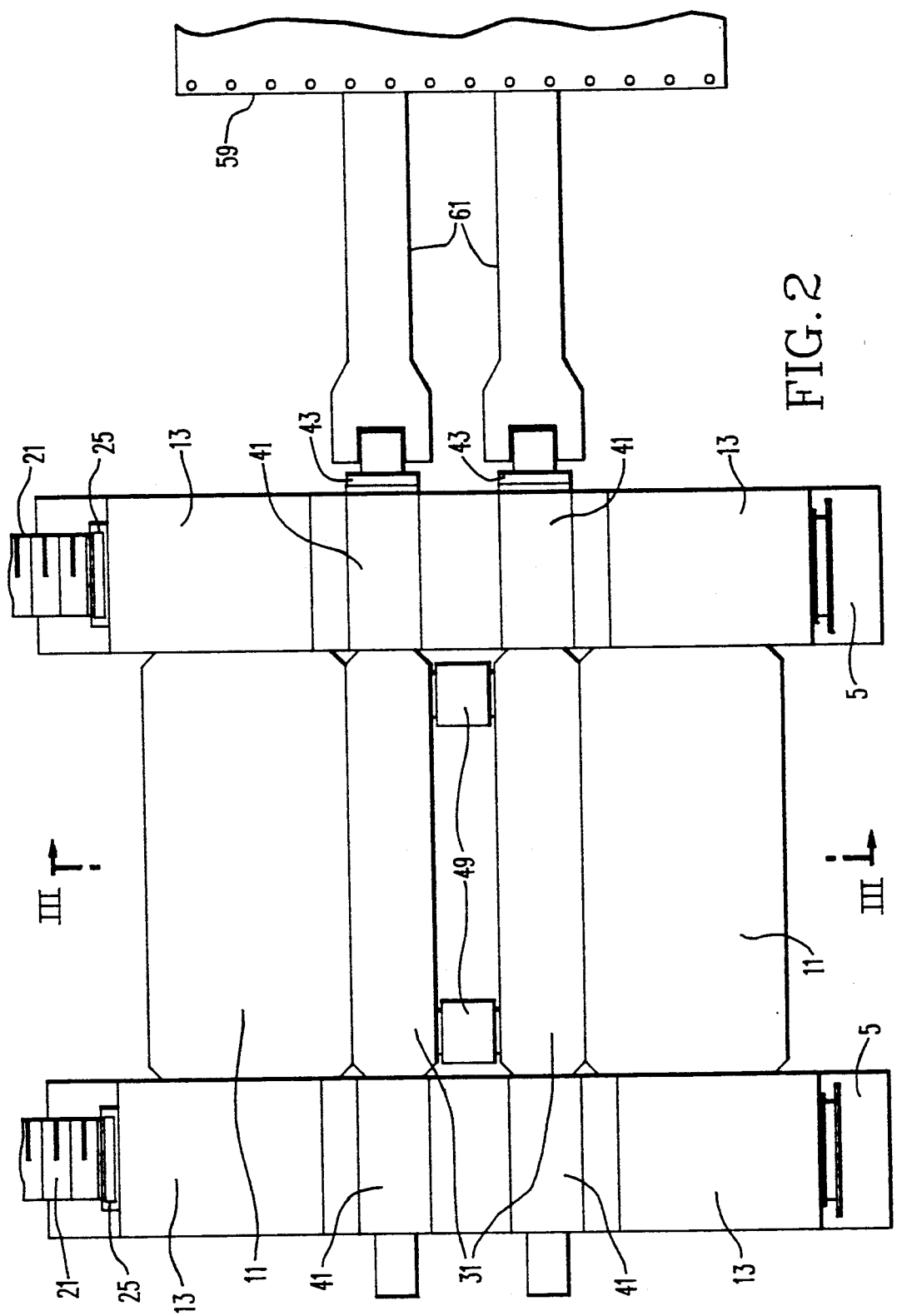
FIG. 2 is a schematic front view of the rolling mill of FIG. 1 incorporating the invention.
Figure 3:
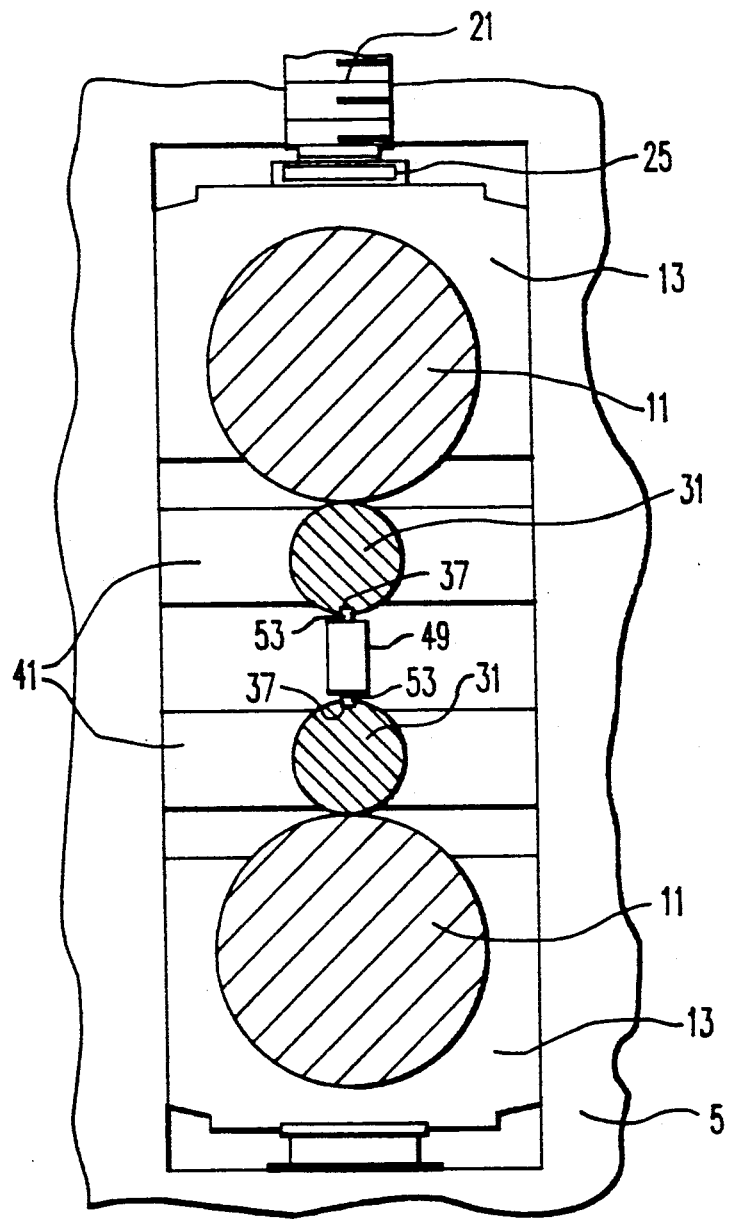
FIG. 3 is a vertical section through the chocks of the rolling mill incorporating the invention illustrated in FIG. 2.
Figure 4:
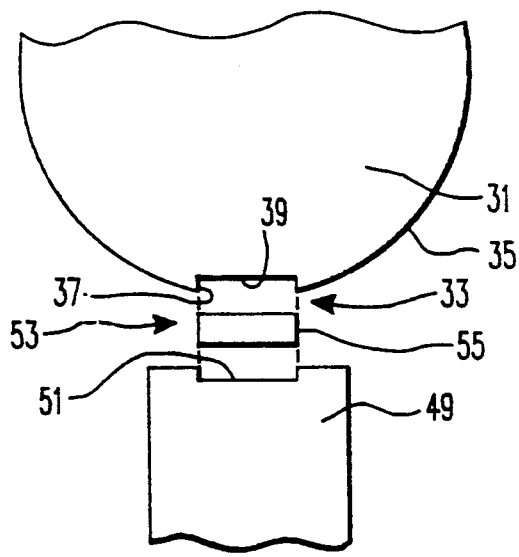
FIG. 4 is an enlarged view of a portion of FIG. 3 illustrating the interlocking of a dedicated calibration roll with a calibration load cell.

In the preferred form of the invention shown in FIGS. 2–4, the working rolls 7 are replaced by dedicated calibration rolls 31. The dedicated calibration rolls 31 are preferably scrap working rolls. Working rolls have a limited life, especially in a hot reduction mill. After every few hours of operation, the working rolls become uneven as a result of uneven loading and are removed and ground down. When a minimum diameter is reached, the working rolls are scrapped. Rolls in hot reduction mills can also become fire cracked and must be scrapped. While these scrap rolls are no longer usable for rolling, a set can be used for the dedicated calibration rolls.

The dedicated calibration rolls 31 are provided with a discontinuity 33 in their generally cylindrical surface 35. In the preferred form shown in detail in the exploded view of FIG. 4, the discontinuities take the form of longitudinally extending grooves 37 which preferably have a flat bottom surface 39.

Figure 7:
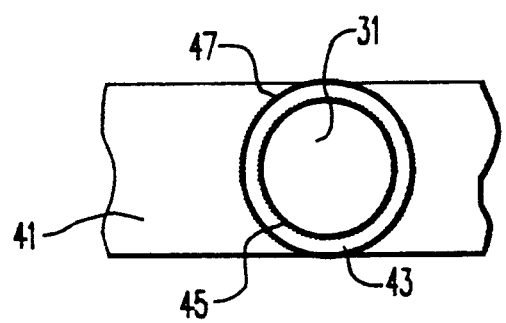
FIG. 7 is a side view illustrating fixing of the calibration roll to the calibration roll chalk.

The dedicated calibration rolls 31 are provided at each end with dedicated calibration roll chocks 41 which can also be scrap components. As is well known, the chocks include bearings (not shown) in which the rolls are journaled for rotation. In the preferred embodiment of the invention, the dedicated calibration rolls are fixedly secured to the chocks to prevent rotation. One means of accomplishing this is shown in detail in FIG. 7. An annular plate 43 is welded at 45 to the dedicated calibration roll 31 and at 47 to the dedicated calibration roll chocks 41. Other mechanical means could be used to secure the dedicated calibration rolls 31 to the chocks 41 to prevent rotation as will be evident to those skilled in the art.

The dedicated calibration rolls 31 are mounted by their dedicated calibration roll chocks 41 in the mill housing 5 in place of the working rolls as illustrated in FIGS. 2 and 3. A pair of calibration load cells 49 are inserted between the dedicated calibration rolls 31 adjacent each end. These calibration load cells 49 are provided with grooves 51, which are also preferably flat bottomed, in their top and bottom surfaces (see FIG. 4). With the calibration load cells 49 in place these grooves 51 confront the longitudinal grooves 37 in the dedicated calibration rolls 31.

As best seen in the enlarged, exploded view of FIG. 4, an interface member 53 in the form of a rectangular locking bar 55 engages the grooves 37 and 51 to interlock the calibration load cells 49 and the dedicated calibration rolls 31 to prevent rotation of the latter and ejection of the calibration load cells. The locking bar 55 is made of a softer material than both the dedicated calibration rolls 31 and the calibration load cells 49. In the exemplary apparatus, the locking bar 55 is a $\frac{3}{8} \times 2$ inch bar of aluminum. This aluminum bar 55 could flows to more evenly distribute the load applied to the calibration load cells 49 load as the multi-million pound working force applied by the mill takes the aluminum past its yield point in compression. This cold flow of the aluminum bar 55 eliminates the need for precision machining of the interfacing parts to remove imperfections such as milling marks.

Replacement of the working rolls with the preferred calibration system requires very little time since it is essentially involves the same procedures as used in periodically replacing the working rolls which is performed routinely in the operation of the rolling mill. The unique arrangement of the invention overcomes the problem of ejection of the calibration load cells through rotation of the rolls, and the effects of uneven loading on roughly machined parts.

Figure 5:
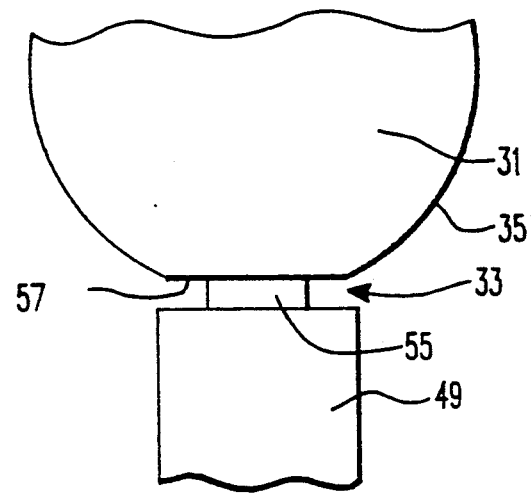
FIG. 5 is a view similar to that of FIG. 4 illustrating another embodiment of the invention.
Figure 6:
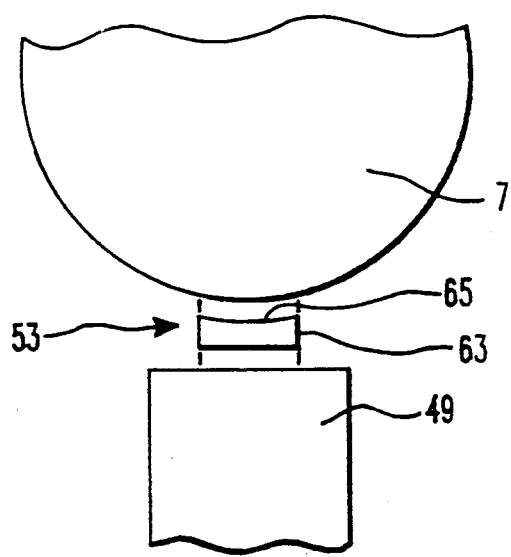
FIG. 6 is also a view similar to that of FIG. 4 and 5 illustrating still another embodiment of the invention.

As an alternative to the grooves in the dedicated calibration rolls 31, the discontinuities in the generally cylindrical surfaces of these rolls can take the form of a flattened surface 57 as shown in FIG. 5. In older installations where the deenergized motor drive 59 connected to the work rolls by drive spindels 61 (see FIG. 2) offers a greater resistance to rotation, or other means are used to prevent roll rotation, the calibration can in some instances be performed with the working rolls 7 in place. The aluminum or other soft material interface member 53 in these instances can take the form of the bar 63 shown in FIG. 6 having concave groove 65 with a radius corresponding to the radius of the work roll 7. Obviously the calibration can be performed quicker in such a case since the working rolls need only be opened to insert the calibration load cells and aluminum bars without replacing the working rolls with dedicated calibration rolls.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Calibration apparatus for a rolling mill having a mill housing, a pair of work rolls, work roll chocks mounting said work rolls in the mill housing, force generating means mounted in said mill housing and applying a generating means mounted in said mill housing and applying a working force to said work rolls through said work roll chocks, and permanent on-line force measuring means measuring said working force, said apparatus comprising means for calibrating said permanent on-line force measuring means including:

a dedicated pair of calibration rolls which replace said work calibration roll chocks which replace said work roll chocks in which said calibration rolls are mounted in said mill housing and through which said working force in applied to said calibration rolls, calibration force measuring means mounted between said calibration rolls measuring force between said calibration rolls in response to the force generated by said force generating means for comparison with measurements made by said permanent on-line force measuring means, and means preventing rotation of said calibration rolls.

2. The apparatus of claim 1 in which said rotation preventing means comprises longitudinal grooves in said dedicated calibration rolls, confronting substantially parallel grooves in said calibration force measuring means and locking bars engaging said grooves in said calibration rolls and in said calibration force measuring means.

3. The apparatus of claim 2 in which said locking bars are made of a material which is softer than both the calibration rolls and the calibration force measuring means.

4. The apparatus of claim 3 wherein said grooves in said dedicated calibration rolls and in said calibration force measuring means are flat bottomed.

5. The apparatus of claim 3 wherein said rotation preventing means further includes means securing said calibration rolls to said calibration roll chocks.

6. The apparatus of claim 1 wherein said rotation preventing means comprises discontinuities in the cylindrical surfaces of said calibration rolls, and interface members between said calibration force measuring means and said discontinuities in said calibration rolls which are softer than both the calibration rolls and the calibration force measuring means.

7. The apparatus of claim 6 wherein said discontinuities in the calibration rolls comprise flat surfaces engaged by said interface members of softer material.

8. A method of calibrating permanent on-line force measuring means which measures a working force applied to a pair of work rolls mounted in a mill housing, said method comprising the steps of:
selecting a pair of dedicated calibration rolls having generally cylindrical surfaces;
forming longitudinal grooves in said dedicated calibration rolls;
replacing said work rolls with said calibration rolls;
forming grooves in opposite surfaces of calibration force measuring means;
inserting said calibration force measuring means between said calibration rolls with said grooves in said calibration force measuring means confronting the grooves in said calibration rolls; and
interlocking the calibration force measuring means with said calibration rolls by inserting an interface member in said confronting grooves, said interface member being softer than both the calibration rolls and said calibration force measuring means.

9. A method of calibrating a permanent on-line force measuring means which measures a working force applied to a pair of work rolls mounted in a mill housing by work roll chocks, comprising the steps of:
selecting a pair of dedicated calibration rolls having generally cylindrical surfaces;
mounting calibration roll chocks on said calibration rolls;
forming discontinuities in the generally cylindrical surfaces of said dedicated calibration rolls;
replacing said work rolls and work roll chocks with said dedicated calibration rolls and calibration roll chocks; and
inserting calibration load measuring means between said dedicated calibration rolls with interface members softer than both said dedicated calibration rolls and said dedicated calibration force measuring means between said dedicated calibration rolls and said calibration force measuring means with said interface member engaging said discontinuities in said dedicated calibration rolls.

10. The method of claim 9 wherein said step of forming said discontinuities in said dedicated calibration rolls comprises forming a flattened surface on said generally cylindrical surfaces.

11. The method of claim 9 wherein said step of forming discontinuities in the generally cylindrical surfaces of said dedicated calibration rolls comprises forming longitudinal grooves therein.

12. The method of claim 11 including forming longitudinal grooves in said calibration force measuring means confronting the longitudinal grooves in said dedicated calibration rolls and inserting said interface member in said confronting grooves.

13. The method of claim 12 including preventing rotation of said dedicated calibration rolls by fixedly securing said dedicated calibration rolls to said calibration roll chocks.

14. In a rolling mill having a mill housing, a pair of dedicated calibration rolls, calibration roll chocks mounting said dedicated calibration rolls in said mill housing, force generating means mounted in said mill housing applying a working force to said dedicated calibration rolls through said calibration roll chocks, and permanent, on-line force measuring means measuring said working force, the improvement comprising means for calibrating said permanent on-line force measuring means and including: calibration force measuring means; interface members mounting said calibration force measuring means between said dedicated calibration rolls, said interface members being of softer material than said dedicated calibration rolls and said calibration force measuring means to evenly distribute said working force over said calibration force measuring means, and rotation preventing means with discontinuities in the cylindrical surfaces on said dedicated calibration rolls which are engaged by said interface members for preventing rotation of said dedicated calibration rolls to retain said calibration force measuring means between said dedicated calibration rolls;
said rotation preventing means includes means fixedly securing said calibration roll to said calibration roll chock;
and said securing means comprises an annular plate welded to said calibration roll and to said calibration roll chock.

15. In a rolling mill having a mill housing, a pair of dedicated calibration rolls, calibration roll chocks mounting said dedicated calibration rolls in said mill housing, force generating means mounted in said mill housing applying a working force to said dedicated calibration rolls through said calibration roll chocks, and permanent, on-line force measuring means measuring said working force, the improvement comprising means for calibrating said permanent on-line force measuring means and including: calibration force measuring means; interface members mounting said calibration force measuring means between said dedicated calibration rolls, said interface members being of softer material than said dedicated calibration rolls and said calibration force measuring means to evenly distribute said working force over said calibration force measuring means, and rotation preventing means with discontinuities in the cylindrical surfaces on said dedicated calibration rolls which are engaged by said interface members for preventing rotation of said dedicated calibration rolls to retain said calibration force measuring means between said dedicated calibration rolls;

said discontinuities in the cylindrical surfaces of said calibration rolls comprises substantially flat surfaces on said dedicated calibration rolls; and said rotation preventing means comprises grooves in the calibration load measuring means substantially parallel to said calibration rolls and which are engaged by said interface members.

16. The rolling mill of claim 15 wherein said rotation preventing means includes means securing said calibration rolls to said calibration roll chocks.

17. In a rolling mill having a mill housing, a pair of dedicated calibration rolls, calibration roll chocks mounting said dedicated calibration rolls in said mill housing, force generating means mounted in said mill housing applying a working force to said dedicated calibration rolls through said calibration roll chocks, and permanent, on-line force measuring means measuring said working force, the improvement comprising means for calibrating said permanent on-line force measuring means and including: calibration force measuring means; interface members mounting said calibration force measuring means between said dedicated calibration rolls, said interface members being of softer material than said dedicated calibration rolls and said calibration force measuring means to evenly distribute said working force over said calibration force measuring means, and rotation preventing means with discontinuities in the cylindrical surfaces on said dedicated calibration rolls which are engaged by said interface members for preventing rotation of said dedicated calibration rolls to retain said calibration force measuring means between said dedicated calibration rolls;

said discontinuities in the cylindrical surfaces of said dedicated calibration rolls comprise longitudinal grooves in the cylindrical surface of said dedicated calibration rolls including grooves in said calibration force measuring means confronting and substantially parallel to said grooves in said dedicated calibration rolls and wherein said interface members comprise locking bars which seat in said grooves in said calibration rolls and the confronting grooves in said calibration force measuring means.

18. The rolling mill of claim 17 wherein said grooves in said dedicated calibration rolls and in said calibration force measuring means are flat bottomed.

19. The rolling mill of claim 17 wherein said rotation preventing means includes means fixedly securing said calibration rolls to said calibration roll chocks.

* * * * *